(12) United States Patent
Roth et al.

(10) Patent No.: US 6,945,077 B2
(45) Date of Patent: Sep. 20, 2005

(54) METHOD FOR TREATING STEEL PLANT SLAG

(75) Inventors: Jean-Luc Roth, Thionville (FR); Guy Denier, Metz (FR)

(73) Assignee: Paul Wurth S.A., Luxembourg (LU)

( * ) Notice: Subject to any disclaimer, the term of this patent is extended or adjusted under 35 U.S.C. 154(b) by 397 days.

(21) Appl. No.: 10/169,571

(22) PCT Filed: Jan. 18, 2001

(86) PCT No.: PCT/EP01/00543

§ 371 (c)(1),
(2), (4) Date: Jul. 2, 2002

(87) PCT Pub. No.: WO01/53543

PCT Pub. Date: Jul. 26, 2001

(65) Prior Publication Data

US 2003/0010060 A1 Jan. 16, 2003

(30) Foreign Application Priority Data

Jan. 21, 2000 (LU) .................................... 90509

(51) Int. Cl.⁷ .............................................. C04B 5/00
(52) U.S. Cl. ............................ 65/19; 65/20; 65/134.4; 65/134.5
(58) Field of Search .................... 65/19, 20, 134.4, 65/134.5

(56) References Cited

U.S. PATENT DOCUMENTS

| | | | |
|---|---|---|---|
| 3,677,728 A | * | 7/1972 | Kitaigorodsky ................. 65/19 |
| 3,830,639 A | * | 8/1974 | Evans et al. .................... 65/19 |
| 4,042,410 A | * | 8/1977 | Ito ................................ 65/20 |
| 4,062,672 A | * | 12/1977 | Kunicki et al. ................ 75/560 |
| 4,082,252 A | * | 4/1978 | Tanaka et al. ............... 266/142 |
| 4,141,722 A | | 2/1979 | Takai et al. |
| 4,179,279 A | | 12/1979 | Harada et al. |
| 4,260,414 A | | 4/1981 | Suzuki et al. |
| 4,725,307 A | | 2/1988 | Harada |
| 5,019,160 A | | 5/1991 | Harada et al. |
| 5,665,137 A | * | 9/1997 | Huang ........................ 65/134.1 |

FOREIGN PATENT DOCUMENTS

| | | |
|---|---|---|
| EP | 0716153 | 6/1996 |
| FR | 2780965 | 1/2000 |
| GB | 1412486 | 11/1975 |
| GB | 1495195 | 12/1977 |

OTHER PUBLICATIONS

Patent Abstracts of Japan—vol. 003, No. 027 (C–039), Mar. 7, 1979 & JP 54 001296 A (Sumitomo Metal Ind Ltd), Jan. 8, 1979 abstract.

Database WPI—Section Ch, Week 199431 Derwent Publications Ltd., London, GB; Class J09, AN 1994–252560 XP002170577 & JP 06 183794 A (Daido Tokushuko KK), Jul. 5, 1994 abstract.

* cited by examiner

*Primary Examiner*—Sean Vincent
(74) *Attorney, Agent, or Firm*—McCormick, Paulding & Huber LLP

(57) ABSTRACT

A method is presented for the treatment of slag from electric steel plants which comprises the following steps: (a) transference of the slag into a metallurgical receptacle; (b) defoaming of the slag in this metallurgical receptacle by adding a defoaming agent, preferably silica; (c) subsequent heating of the slag to make it fluid; and (d) forced cooling of the slag, for example by an aqueous granulation.

12 Claims, 1 Drawing Sheet

METHOD FOR TREATING STEEL PLANT SLAG

FIELD OF THE INVENTION

The present invention relates to a method for the treatment of slag from electric steel plants.

BACKGROUND OF THE INVENTION

In electric furnaces, the slag is at present vigorously aerated so as to improve the performance of the furnace, protect its walls, slow down the wear on the electrodes and reduce the noise. However, unlike the molten slag from blast furnaces, that from electric steel plants cannot be commercially exploited and is simply poured on to slag tips. One of the main reasons for this is that the final conditioning of a foamed slag, for example in the form of an aqueous granulation as carried out on blast-furnace slag, is difficult to execute. Electric-furnace slag in fact forms a voluminous foam that does not flow easily and that is impossible to cool suddenly. In addition, the temperature of an electric-furnace slag is close to that at which solidification takes place (nearly 1600° C.), thus making the slag viscous and also naturally limiting the possibility of any realistic conditioning of the slag.

Another factor limiting the possibilities of commercially exploiting the electric-furnace slag is that it contains free lime. It is therefore impossible to use it as landfill for civil engineering projects since the free lime would cause subsequent swelling of the material. In order to stabilise the slag before use, it is possible to turn over the slag tip and water it regularly, i.e. neutralise the free lime with water, but this is a costly practice and is unreliable.

U.S. Pat. No. 4,179,279 relates to a process which should produce a stabilised electric-furnace slag. According to this process, "red mud", that is to say a residue of the process of treating bauxite by caustic soda, in the form of briquettes or pellets is charged into molten slag produced by an electric furnace. The physical form of the molten slag is not described. Since the melting point of the red mud is substantially lower than the temperature of the molten slag, up to 20% of red mud can be added to the molten slag without outside heat source, and up to 50% of red mud could even be added to the molten slag if an outside heat source is provided for melting the red mud. According to U.S. Pat. No. 4,179,279, the red mud seems to react with free CaO and $2CaO.SiO_2$ of the slag. The U.S. patent does not describe the manner in which the molten mixture of slag and red mud could be conditioned for its subsequent commercial exploitation. However, the U.S. patent confirms what was previously said about the rapid cooling of the electric-furnace slag.

It would be advantageous to have available a process that would enlarge the possibilities for commercial exploitation of electric-furnace slag. In conformity with the invention, this objective is attained by a method according to Claim 1.

SUMMARY OF THE INVENTION

A method of treating the slag from an electric steel plant according to the invention comprises the following steps:
(a) transference of the slag into a metallurgical receptacle;
(b) defoaming of the slag in this metallurgical receptacle by adding a defoaming agent;
(c) subsequent heating of the slag to make it fluid;
(d) forced cooling of the said slag.

According to an important aspect of the present invention, the slag is defoamed in order to reduce its porosity and thus to increase its thermal conductivity. Subsequently, the slag is heated in the metallurgical receptacle to make it more fluid. This process yields a slag from the electric steel plant whose physical form—liquid, homogenous and fluid—approaches that of blast-furnace slag and is much more suitable for forced cooling. As a result of this, the slag can be more easily manipulated before and during the forced cooling. There is no longer any risk of the slag solidifying in the metallurgical receptacle, even if it is disturbed during step (d). Advantageously, a cooling is then carried out that is adapted to the type of commercial exploitation envisaged for the solid product. It would be possible, for example, to vary the grain size of the slag by cooling it more quickly or more slowly, which enlarges the possibilities for its commercial exploitation.

According to a first mode of execution, the defoaming agent mainly comprises FeO, for example from the scale produced during rolling. The FeO has the two-fold effect of defoaming the slag and also of lowering its melting point. In fact, the electric-furnace slag, which normally consists of 35–45% of CaO, 15–20% of $SiO_2$ and 25–35% of iron oxides, behaves essentially as a ternary $CaO—SiO_2—FeO$ mixture. As can be seen on a phase diagram of this ternary mixture, an increase in the proportion of FeO (from the proportions indicated above) in such a mixture causes a lowering of its melting point.

According to a second mode of execution, the defoaming agent consists mainly of silica, for example in the form of sand. In a similar way to FeO, silica makes it possible to defoam the slag and lower its melting point. Preferably, sufficient silica is added to lower the melting point of the slag to below 1300° C. Part of the added silica will also combine with the free lime still present in the slag, thus stabilising the said slag. Such a stabilised slag turns out to be particularly advantageous for applications in civil engineering work.

Advantageously, oxygen is injected into the slag at step (b), thus giving a thermochemical oxidation treatment to the iron contained in the slag. The iron acts as a fuel in the oxidation treatment, which causes a rise in the temperature of the slag. In addition, the formation of FeO during this treatment is accompanied by an additional lowering of the melting point of the slag.

If necessary, an additional input of heat at step (b) may be provided. For this purpose, a metal whose oxidation is highly exothermic (for example, Si or Al) may in particular be added to the bath of slag. The additional input of heat may also be provided by the combustion of a fossil fuel or by electric arcs.

According to a preferred mode of execution of the method, a step (c') is inserted between steps (c) and (d) in order to adjust the composition of the slag. This step makes it possible to modify the composition of the slag, especially with its future use in mind. In particular, phosphorus may be added if the slag is to be used as a fertiliser.

Preferably, a stage (c") is provided between steps (c) and (d) in order to homogenise the said slag. On emerging from this step, the slag is liquid, fluid and very uniform. It is then in a more suitable state for forced cooling, such as that involved in aqueous granulation.

The metallurgical receptacle will advantageously be heated up before the transference of the slag at step (a). Less heat will then have to be provided during the heating step (c) and this step will then be shorter.

BRIEF DESCRIPTION OF THE DRAWINGS

Other special features and characteristics of the invention will emerge from the detailed description of one advantageous mode of execution given below as an illustrative example, with reference to the appended drawings. These show.

DETAILED DESCRIPTION OF THE PREFERRED EMBODIMENT

The method according to the invention relates to a method for the treatment of slag from electric steel plants that comprises the following steps:

(a) transference of the slag into a metallurgical receptacle;
(b) defoaming of the slag in this metallurgical receptacle by adding a defoaming agent;
(c) followed by heating of the slag to make it fluid;
(d) forced cooling of the slag.

A description using FIGS. 1 to 6 will illustrate the method and enable it to be more clearly understood.

Figure 1:
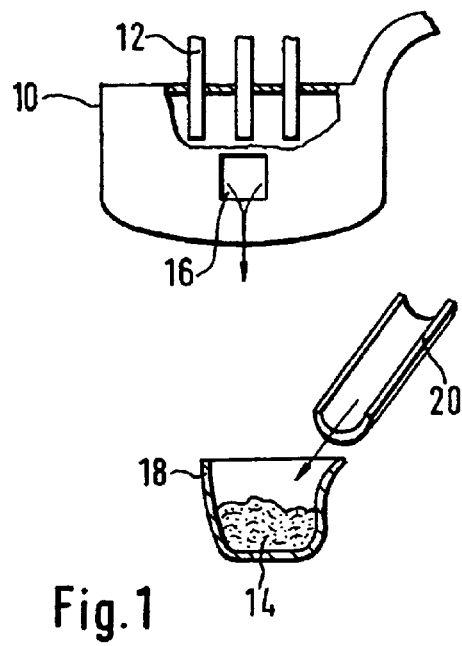
FIGS. 1 to 6: outline sketches illustrating the various steps in a preferred mode of execution of the method according to the invention.

FIG. 1 illustrates steps (a) and (b). An electric furnace, denoted by the reference number 10, is fitted with three electrodes 12. The slag 14 that covers the surface of the bath of metal is made to foam in a traditional manner. The presence of a foaming slag 14 between the electrodes and the metallic bath improves the performance of the furnace 10, protects its walls, slows down the wear on the electrodes 12 and reduces the noise. When the charge of scrap has melted, the slag 14 is scoured. It is removed from the surface of the metallic bath through a side opening 16 made in the wall of the furnace 10 and is transferred in accordance with step (a) into a metallurgical receptacle 18, such as a trough or a ladle. After step (a), which may require 10 to 15 minutes, the metallurgical receptacle 18 therefore contains a foamed and viscous slag 14. Its composition generally comprises 35 to 45% CaO, 15 to 20% $SiO_2$, 3 to 6% $Al_2O_3$, 2 to 4% MgO, 25 to 35% iron oxides (FeO and $Fe_2O_3$), 3 to 6% of other oxides(MnO, $Cr_2O_3$, $P_2O_5$, etc.) and 2 to 4% of metallic iron. Such a slag 14 partially solidifies below 1600° C., rejecting lime silicates (CaO—$SiO_2$ combinations). Once the saturation limit of dissolved lime silicate has been reached, free lime remains in the slag 14. It will thus be appreciated that the electric-furnace slag 14 at the output from the electric furnace 10 is in a physical form (foamed and viscous) that does not lend itself to granulation. In addition, the composition has not been stabilised, since the free lime (CaO) is in danger of reacting. With the water at any moment and causing the slag 14 to swell.

According to an important aspect of the present method, the slag 14 is defoamed in the metallurgical receptacle 18 at step (b) by adding a defoaming agent to it. FIG. 1 shows a chute 20 used for the addition of the defoaming agent. The said agent advantageously consists of sand, mainly comprising silica. It should be appreciated that the defoaming effect of the sand produces an essentially liquid slag 14. It should also be appreciated that the addition of the sand lowers the melting point of the slag 14. In fact, the melting point of the slag 14 depends on its composition. However, the three main components of the slag 14 are lime CaO, silica $SiO_2$ and iron oxides (FeO and $Fe_2O_3$). Thus, the slag essentially consists of a ternary CaO—$SiO_2$—FeO mixture. By adding silica, the proportion of $SiO_2$ in the slag 14 is increased. As can be seen from the phase diagram of the said ternary mixture, an increase in the proportion of $SiO_2$ brings about a lowering of the melting point of the slag 14. Preferably, sufficient sand is added to lower the melting point to 1300° C. Finally, the addition of silica to the slag 14 also counters its reactivity. The free lime combines with the silica to form lime silicates, thus stabilising the slag 14.

Figure 2:
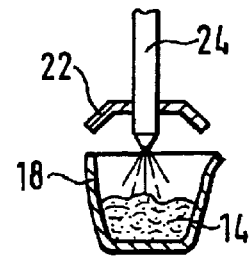

At step (c), illustrated by FIG. 2, the slag 14 is heated in the metallurgical receptacle 18 to render it more fluid. The said heating is preferably carried out by a thermochemical oxidation treatment of the iron contained in the slag 14. For this purpose, placed over the metallurgical receptacle 18 is a lid 22 through which an oxygen lance 24 is introduced in order to inject oxygen into the slag 14. This treatment brings about the oxidation of at least part of the iron in oxidisable form contained in the slag, i.e. the metallic iron (Fe) and the oxide FeO. The heat released by these exothermic reactions is normally sufficient on its own to render the slag 14 fluid enough for its after-treatment, and retards the solidification of the slag 14. It should also be pointed out that the formation of FeO in the slag 14 increases the proportion of FeO in the ternary CaO—$SiO_2$—FeO mixture, which brings about an additional lowering of the melting point of the slag 14 and further retards the solidification of the slag 14. In particular, this induces a longer period of time for the operations involved in the after-treatment of the slag.

If the heat contributed by the thermochemical oxidation treatment is insufficient, however, provision is advantageously made for an additional input of heat. One may then add to the bath a metal whose oxidation is strongly exothermic, for example Si or Al. An additional input of heat may also be supplied by a source of energy using a fossil fuel (a gas burner) or using electrical energy (an electric arc).

Figure 3:
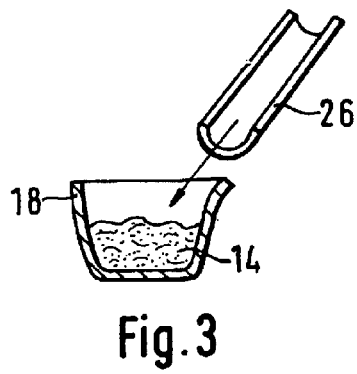
Figure 4:
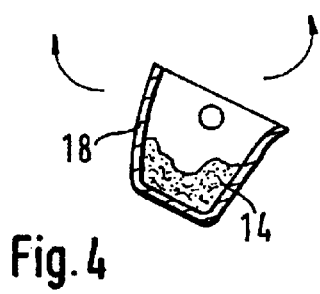

FIG. 3 illustrates step (c'), following step (c), during which an adjustment may be made to the composition of the slag 14. Preferably, a chute 26 is used to introduce a limited quantity (about 1%) of additives. Here, it is a matter of adapting the composition of the slag keeping in mind the type of commercial exploitation envisaged. For example, the addition of phosphorus makes it possible to use the solidified slag as a fertiliser.

At the next step, (c''), the mixture is homogenised. The homogenisation is advantageously achieved by agitation. It is, for example, sufficient to tilt the ladle backwards and forwards for a few minutes, as indicated by the arrows in FIG. 4.

At this stage of the process, the slag contained in the metallurgical receptacle has become much more suitable for forced cooling. In fact, the defoaming agent has made the slag essentially liquid. In addition, the heating has made the slag 14 more fluid. The choice of silica as the defoaming agent achieves several goals: defoaming, lowering of the melting point, stabilisation.

Figure 5:
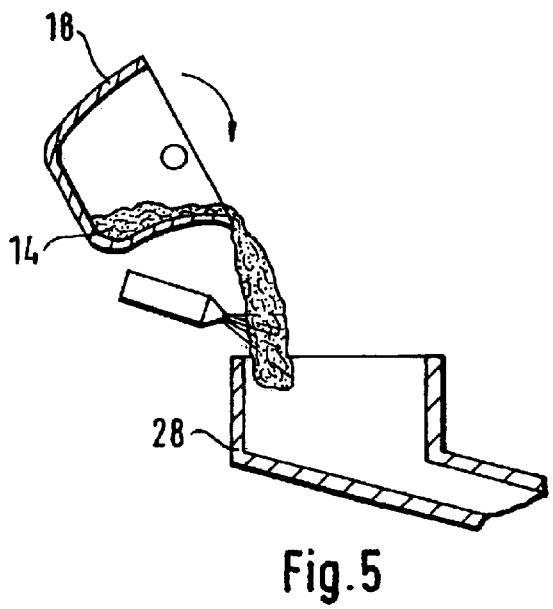

In accordance with step (d), a forced cooling of the slag 14 is then carried out. This is preferably achieved by an aqueous granulation of the slag 14 as shown in FIG. 5. The metallurgical receptacle 18 is tilted and the slag 14 is poured into a granulation vat 28. The physical form of the slag 14, which is now liquid and fluid, ensures excellent heat exchange with the water during granulation. It is thus possible to cool the slag 14 suddenly and effectively, giving a high efficiency and a good quality of granulation.

It will be appreciated that the forced cooling of the slag 14 must be adapted to the type of commercial exploitation envisaged for the said slag. In order to modify the properties of the solidified slag, variations might be made in the type of forced cooling (aqueous granulation vat with or without jets of water, flow over a cooled surface with or without watering, forced circulation of air or water vapour, etc.) and in the rate of cooling.

Figure 6:
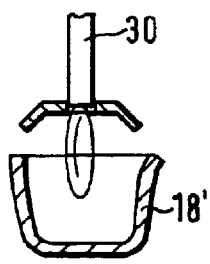

It remains to point out that the metallurgical receptacle 18 is advantageously heated up before step (a) so as to reduce and limit the heat losses from the slag 14. It would be possible, for example, to operate with two metallurgical receptacles 18 and 18'. The second metallurgical receptacle 18' is then preheated with a natural gas burner 30, as illustrated in FIG. 6, while the other is in use.

EXAMPLE

As an example, the method described above is applied to a slag scoured from an electric furnace casting 80 t of steel. The quantity of scoured slag is 10 t. It has the following composition: 40% CaO, 20% $SiO_2$, 30% (FeO and $Fe_2O_3$), and 2.5% metallic iron.

The successive steps of the method are listed in the following table. This also indicates the values and indicative times for each step and the appropriate figure.

It should be noted that two metallurgical receptacles are preferably used. The second metallurgical receptacle 18' is preheated (FIG. 6) with a 1 to 2 MW natural gas burner 20 for 30 to 45 minutes.

| Step | Operation | Indicative time | Figure |
|---|---|---|---|
| (a) | Transference of slag into the metallurgical receptacle (during scouring) | 10 to 15 min | 1 |
| (b) | Defoaming by the addition of 1.4 t of sand | 2 min | 1 |
| (c) | Heating by blowing through 400 $m^3$ of $O_2$ and adding 80 kg of FeSi (75% Si) | 20 to 30 min | 2 |
| (c') | Adjustment of composition | 3 min | 3 |
| (c") | Homogenisation by agitation | 3 min | 4 |
| (d) | Aqueous granulation | 10 min | 5 |

What is claimed is:

1. A method for the treatment of slag from an electric steel plant comprising the following steps:

(a) transferring said slag into a metallurgical receptacle;

(b) defoaming said slag in said metallurgical receptacle by adding a defoaming agent thereto;

(c) after defoaming, heating said slag to make it fluid; and (d) forcedly cooling said slag.

2. The method according to claim 1, wherein the defoaming agent consists mainly of FeO.

3. The method according to claim 1, wherein the defoaming agent consists mainly of silica (SiO2).

4. The method according to claim 3, wherein sufficient silica is added to lower the melting point of said slag to below 1300° C.

5. The method according claim 1, wherein:

said slag contains iron, and oxygen is injected into said slag at step (b) in order to achieve a thermo-chemical oxidation treatment of said iron contained in said slag.

6. The method according claim 5, further comprising an additional input of heat at step (b), said additional heat input being obtained by an oxidation of a metal other than iron.

7. The method according claim 5, further comprising an additional input of heat at step (b), said additional heat input being obtained by combustion of a fossil fuel or by a source of electric energy.

8. The method according to claim 1, wherein the composition of said slag is adjusted between steps (c) and (d).

9. The method according to claim 8, wherein phosphorus is added to said slag.

10. The method according to claim 1, wherein said slag is homogenised between steps (c) and (d).

11. The method according to claim 1, wherein said forced cooling is an aqueous granulation.

12. The method according to claim 1, wherein said metallurgical receptacle is preheated before transferring said slag into said metallurgical receptacle.

* * * * *